United States Patent [19]

Schenkel et al.

[11] 3,846,587

[45] Nov. 5, 1974

[54] DATA TRANSMISSION SYSTEM FOR A MULTIPLE BRANCH NETWORK

[75] Inventors: Klaus Dieter Schenkel, Senden; Wolfgang Herzig, Seligweiler; Rudolf Schehrer, Geisling En/Steige; Rupert Hildenbrand, Ulm-Soflingen, all of Germany

[73] Assignee: LICENTIA Patent-Verwaltungs G.m.b.H., Frankfurt am Main, Germany

[22] Filed: Feb. 22, 1973

[21] Appl. No.: 334,757

[30] Foreign Application Priority Data

Feb. 22, 1972 Germany .......................... 2208159

[52] U.S. Cl. ..... 179/15 AL, 179/15 AT, 179/15 BA

[51] Int. Cl. ........................................ H04j 3/08

[58] Field of Search ........179/15 AT, 15 AL, 15 BS, 179/15 BA

[56] References Cited

UNITED STATES PATENTS

| | | | |
|---|---|---|---|
| 2,406,165 | 8/1946 | Schroeder | 179/15 AL |
| 3,362,881 | 1/1972 | Graham | 179/15 AL |
| 3,597,549 | 8/1971 | Farmer | 179/15 AL |
| 3,647,976 | 3/1972 | Moses | 179/15 AL |
| 3,659,271 | 4/1972 | Collins | 179/15 AL |
| 3,732,543 | 5/1973 | Rocher | 179/15 AL |

*Primary Examiner*—Ralph D. Blakeslee
*Attorney, Agent, or Firm*—Spencer & Kaye

[57] ABSTRACT

A communication network having a plurality of branches, each composed of two transmission lines, utilizes a miltiple access data transmission system. A plurality of individual user stations are connected to the branches. The branches are interconnected via a plurality of nodes so as to form an interconnected system of all of the user stations. A synchronizing word generator is centrally disposed within the network for periodically transmitting synchronizing words. At the end of each of the branches, there is connected a reflection free sink which only transfers the synchronizing words between the two lines of the branch. Each of the user stations has circuitry for dividing the interval between two successive synchronizing words into n equal time slots and for transmitting a data block signal within a free time slot.

12 Claims, 7 Drawing Figures

DATA TRANSMISSION SYSTEM FOR A MULTIPLE BRANCH NETWORK

BACKGROUND OF THE INVENTION

The present invention relates to a multiple access data transmission system for a communication network having a plurality of branches to which individual user stations are connected.

With the increasing demands for new communication systems, for example for more rapid data transmission, picture transmissions, etc., there is an increasing desire for an integrated data transmission system in which the connected users receive all communications over a single connecting line.

Since the transmission lines connecting these users must have a wide bandwidth for the transmission, of pictures, it is advisable to utilize this bandwidth for data transmissions with multiple access for the individual users. The advantages of utilizing such a method are as follows:

1. the average length of the user connecting lines is substantially reduced since there is no central office;
2. it is possible to have direct data transmission between two users simultaneously with a transmission directed to all users (e.g. television, radio); and
3. there is a great potential for increasing the number of users.

A prerequisite for such a system, however, is the utilization of a transmission line with a very wide bandwidth.

At first view, it might appear that time-division multiplex methods would be particularly well suited for such transmission purposes because of the large number of channels which can be accommodated on a transmission path with a given bandwidth. Generally, in these methods, the address of the recipient of information is fixed within a time slot for the entire duration of the transmission. This use of a fixed position for the address causes the drawback, in linked networks with multiple access, that each network section between two nodes or a node and the end of a line must be matched with respect to its travel time in such a way that whole multiples result for the duration of the time frame. To provide for such matching is expensive, especially in integrated communication networks, since the equalization of the various travel times must be made dependent on the duration of the time frame of the slowest digital information signal to be transmitted. On the other hand, however, such a time-division multiplex method permits the greatest possible number of information channels to be transmitted on a transmission path of a given bandwidth.

SUMMARY OF THE INVENTION

An object of the present invention is to provide a communication network which utilizes a time-division multiplex multiple access method (TDMA) without the above-mentioned drawbacks.

Another object of the present invention is to provide a TDMA communication network in which various information signals can be simultaneously transmitted with equal priority and which requires no central office.

These objectives are accomplished according to the present invention in that a synchronizing word generator, disposed arbitrarily, preferably at a central point in the network, periodically emits a synchronizing word to establish a time frame, which synchronizing word is transferred to all lines of the communication network and each user station divides the interval between two successive sync words into n equal time slots such that the data transmitted by a transmitting user station can be transmitted as a data block in one or a plurality of these time slots.

While in the data transmission system constructed in accordance with the present invention the same number of data channels can be realized as in the known time mulitplex methods, the expenditures involved in the matching of the travel times are substantially eliminated. The present invention provides a data transmission system with multiple access for the connected users, i.e., without a central office, which system can be used in a multiple branch communication transmission network, thus resulting in a minimum of expenditures with good utilization of the transmission bandwidth, i.e., with the greatest number of channels. In this transmission system, it is preferable to utilize optical waveguides for the transmission channels. The number of users connected within the network can be expanded with a minimum increase in expenditures as compared to conventional systems. The only factor limiting the number of users that can be connected within the network is the bandwidth of the transmission channel.

The data transmitted by the user stations, which can be transmitted in either direction along the branches, is temporarily stored within a memory unit at a node. The stored data is read out from the memory unit on a priority basis such that the data is transmitted along the desired direction within a free time slot. This system, therefore, prevents overlapping and a resulting destruction of the information.

In a modified embodiment of the present invention, each of the branches has a transmitting line and a receiving line such that information can only be transmitted in one direction and received from the opposite direction. These two lines are connected at one point of the network such that the data transmitted along the transmitting line is transferred to the receiving line. This arrangement simplifies the construction of the nodes by limiting the number of required memory units.

DESCRIPTION OF THE PREFERRED EMBODIMENTS

Figure 1:
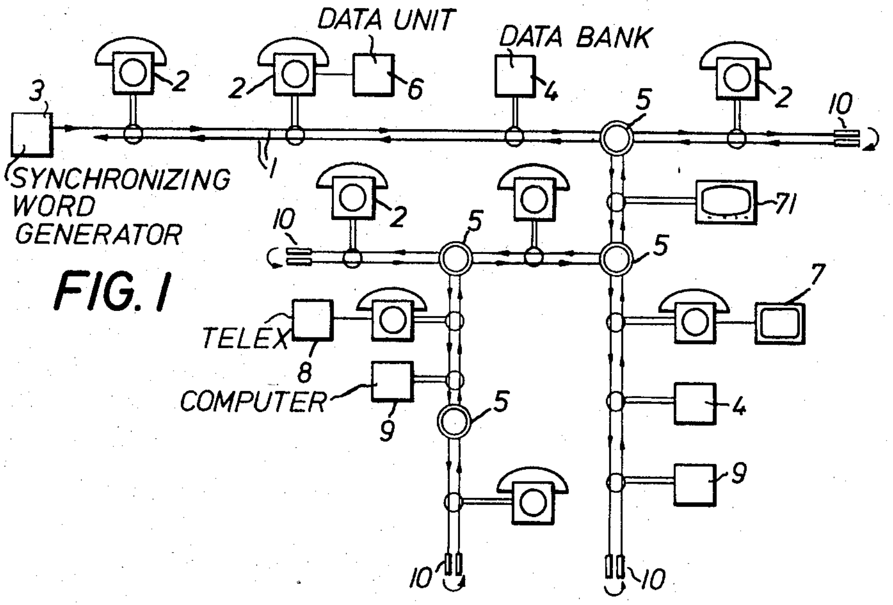
FIG. 1 is a block circuit diagram of a multiple branch network to which various user instruments are connected, in accordance with the present invention.

FIG. 1 shows a network configuration having a plurality of branches which is particularly suited for the communications transmission network according to the present invention in which there are no closed links. Reflection free sinks 10 are connected at the ends of the branches.

The network configuration shown in FIG. 1 has a number of user stations 2 which are connected together by the branches, which consist of transmission lines 1. All of the user stations 2 periodically receive a transmission of a synchronizing word from a synchronizing word generator 3 which is connected arbitrarily at the network, preferably at a central point in the network. These sync words are transferred at the line ends 10 from the end of the incoming line to the outgoing line.

In the network arrangement illustrated in FIg. 1, various instruments are provided at the different user stations 2 which may be considered the end instruments of the user stations. These instruments can include, for example, a data unit 6, a telex machine 8, a video device 7 or a data viewer 71.

In this network arrangement of FIG. 1, there is also shown different types of user station, for example, the data bank 4 as well as the computer 9. In such a network arrangement the individual network branches are connected together by nodes 5.

Figure 2:
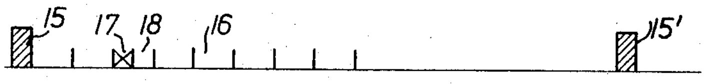
FIG. 2 is a time diagram for the channel grouping between two successive synchronizing words in the operation of the system of FIG. 1.

FIG. 2 is a time diagram for the channel grouping between two successive sync words 15, 15′ with time slots 16 and an information block signal containing the address signal 17 and the data block signal 18. Each user station divides the interval between two sync words 15, 15′, which corresponds to one time frame, into n time slots 16 of equal duration. The data transmitted by a user station is periodically transmitted in the form of data blocks at the frame frequency in one or a plurality of these time slots.

In this first embodiment of the present invention, it is assumed that the data information from a user is transmitted during the entire transmission period along the connecting path and that this transmission does not always occur in the same time slot location. It, therefore, is necessary to have the data block 18 preceded by the address 17 of the called user in order to enable the data blocks to be identified. For optimum utilization of the transmission bandwidth, the address 17 and the data block 18 should completely fill one time slot.

Figure 3:
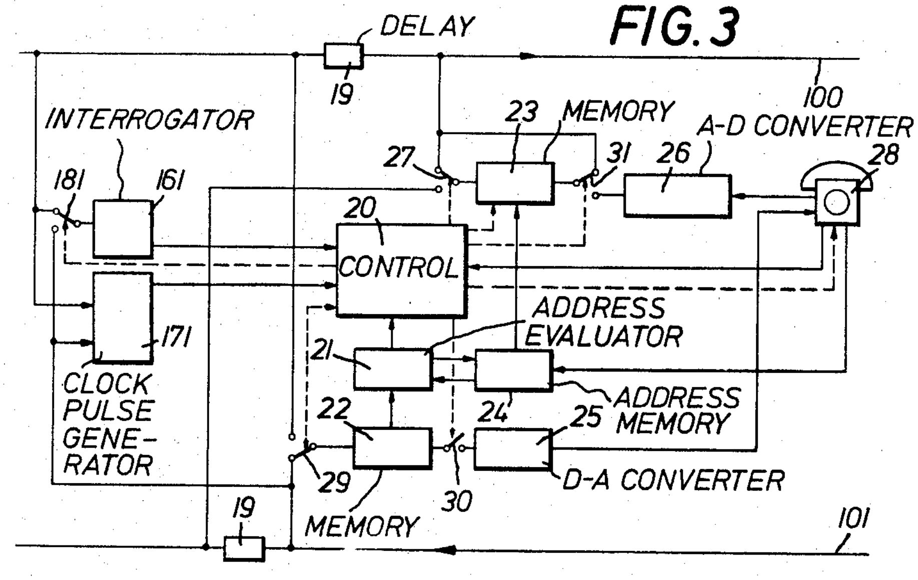
FIG. 3 is a block circuit diagram of one of the user instruments of FIG. 1.

FIG. 3 shows the block circuit diagram of one of the user stations. A time slot interrogator 161 is alternatingly connected with the two transmission lines 100 and 101, constituting line 1 of FIG. 1, via a switch 181. A clock pulse generator 171 which is also connected to both lines generates the bit clock pulses and the time slot clock pulses for both transmission directions. Analog data information which is to be transmitted by the end instrument 28 is coded in the analog/digital converter 26 and transmitted via switch 31, transmitting memory 23 and switch 27, to the transmission line 100 or 101. If end instrument 28 already furnishes digital data information, the instrument 28 is directly connected with the free contact of switch 31.

Switch 29 feeds the incoming data from both lines via receiving memory 22, switch 30 and the digital/analog converter 25 to the end instrument 28. Switch 30, address evaluator 21 and address memory 24 feed to the instrument 28 only that information recorded in receiving memory 22 which, according to its address, is intended for this particular user. At the same time, address memory 24 writes the receiving address into transmitting memory 23 when data is being transmitted. Control 20 monitors the orderly operation during the establishment of a connection and evaluates the control signals of units 161, 171, 21 and 28 and, on the other hand, emits control signals to units 181, 29, 30, 23, 27, 28 and 31. The delay units 19, which may produce, for example, a delay of the data by 1 bit, assure that time slot recognized as being free can be immediately occupied when required without bit losses.

The control 20 is a wired program or stored program control unit which is similar to the central control unit of a conventional switching system. It makes sure that according to a "one-step-at-a-time" procedure the various signals to and from instrument 28 (e.g., dialed number) are correctly fed to the respective units 23, 24, 25, 26 and that all steps necessary to establish a connection and to transmit and receive data blocks are done correctly. For this reason furthermore signals originating from 161, 171, 21 are processed in the control 20 yielding other signals to read in and read out data blocks (addresses and data) into the transmitting memory 23 and receiving memory 22 in appropriate time slots detected by interrogator 161.

If a calling user X dials the address of his intended partner Y, the establishment of the connection takes place as follows:

The address Y is written into address memory 24. The address/data combinations alternately arriving from both transmission directions, for example alternating from time frame to time frame, at receiving memory 22, via switch 29, are checked by the address evaluator 21 to determine the presence of address Y. If this address Y is not present, i.e., if user Y is not already busy with another data transmission, the user instrument X transmits the address combination (X,Y) in a free time slot. A free time slot is recognized by the time slot interrogator 161 in that the first bit of a free time slot is a "0."

If the user instrument of Y has recognized the "call," it transmits an acknowledgement in the form of the address combination (Y,X), which actuates the go-ahead signal at user X's station. Then the instrument of user X transmits the address combination (Y,Y) which actuates the ringing device at user station Y. When user Y lifts the receiver, the address/data combination (X address, data block) is transmitted. The instrument of user X then terminates the go-ahead signal and transmits the address/data combination (Y address, data block). The connection between users X and Y is now considered to be established. If a faulty double occupancy of a time slot interferes with the data and address contained within the slot, then the instrument of the partner participating in the transmission automatically answers by the transmission of an error word instead of the data block and the instrument of the interfered with partner searches for a new free time slot.

In order to detect whether or not a time slot is occupied by an address/data combination, it is advantageous to establish that the address always begins with a binary "1."

In each of the nodes, it is necessary to equalize the travel times of the data being transmitted. This travel time equalization is necessary to the extent that the data channels approaching the node from the various directions are in synchronism with respect to the time slots and not with respect to the time frames. This equalization is accomplished through the utilization of controlled buffer storage units.

Figures 4, 5, 6, 7:
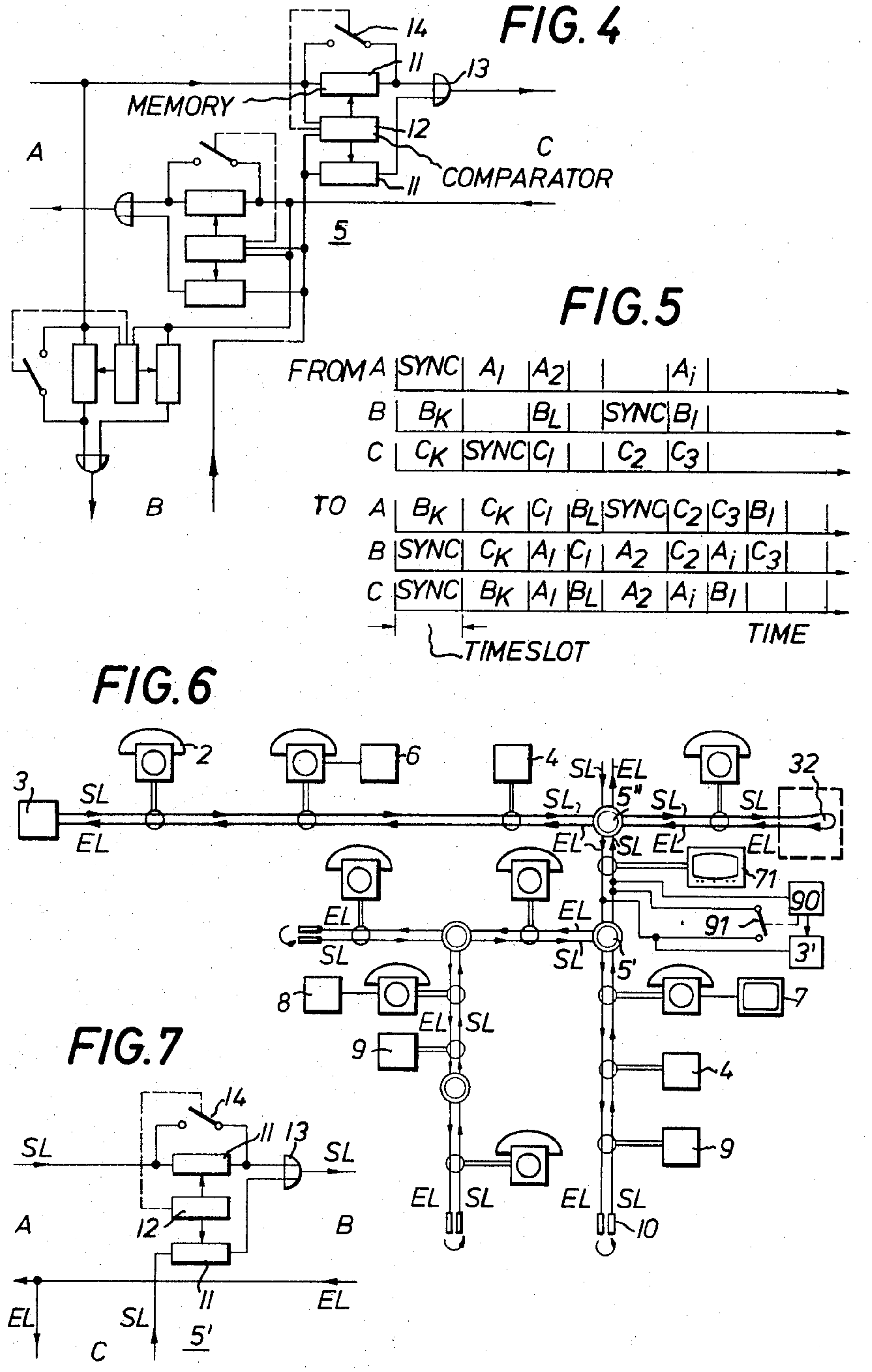
FIG. 4 is a block circuit diagram of one of the network nodes of FIG. 1 with circuitry for temporarily storing data for the purpose of compensating for the travel times of the data flow arriving from three different branches.
FIG. 5 is a time diagram showing the interlacing of the sync words and data block signals arriving from the branches A, B and C, performed by the node circuit of FIG. 4.
FIG. 6 is a block circuit diagram of a multiple branch network similar to FIG. 1, however with separate transmitting and receiving lines, the ends of which lines are connected at one point within the network.
FIG. 7 is a block circuit diagram of one of the network nodes of FIg. 6 for temporarily storing data arriving at the node exclusively from the transmitting lines.

FIG. 4 shows the block circuit diagram of one of the nodes 5 of FIG. 1. This node circuit includes three node units each of which includes two memories 11, a comparator circuit 12, a switch 14 and an OR circuit 13. The branches of the network, A, B, and C, which are connected to the node represent the directions from which data signals arrive, or toward which they travel. As can be seen from FIG. 4, the incoming transmitting line of each branch is connected by a respective node unit to the outgoing transmitting lines of the other two branches. The comparator circuit consists of two forward-backward counters which count the stored data blocks in each respective memory. Both counters are compared with respect to which of them shows a higher counting. According to this a read out signal is fed to the memory with the higher number of stored data blocks by the comparator so as to read out a data block in the next time slot to OR-gate 13.

The data channels arriving at the nodes from the various directions have equal priority with respect to their further transmission along the outgoing data paths. These data channels are initially stored in memories 11 which can hold a plurality of time slots. A comparator circuit 12 recognizes which one of the memories assigned to an outgoing data path is filled with time slots containing stored data. This memory is always read out with priority in the next time slot in the outgoing direction under the control of comparator circuit 12. Thus a "zipper system" for interlacing the outgoing data is utilized, which system is automatically adapted to the amount of incoming traffic. The control device 12 in the node unit for controlling the respective memories performs no connecting functions but is merely a comparator circuit. With this "zipper-system" all incoming data block signals are delayed in such a way that even in the case of simultaneously arriving data block signals an interlaced array of blocks is performed avoiding any overlapping and thus destruction of data block signals.

In contrast to the transmission of data block signals, there does exist a preferred direction for the transmission of the sync word. Since at the end of each network branch all data enters the reflection free sink 10, the sync word, in order to synchronize the data path going from the end of the network branch to the last node, must be transferred at the end of the incoming line to the outgoing line. For this reason a correlation receiver is introduced into the sink which detects the sync words and immediately switches the sync words from the end of the incoming line to the outgoing line. All data blocks are consequently disconnected from the outgoing line since the correlation receiver does not identify them as sync words. This results in the necessity in the nodes of suppressing all of these "reflected" sync words except for one, in order to prevent "flooding" of the entire network with sync words.

As already mentioned, the sync words are generated at a single point within the network. If a malfunction occurs in the generation of the sync words, a further embodiment of the present invention provides that the node directly adjacent to the synchronizing word generator which is the first to detect this absence of the sync word automatically functions as a new clock pulse center and transmits the sync word in rigid clock pulse and phase relationship with respect to the prior clock pulse. Each node contains a control unit 90 connected to the two transmission lines EL and SL leading to the node of next higher order. Furthermore a switch 91 between lines EL and SL and a sync word generator 3′ connected to line EL is inserted. In case of a malfunction of the sync generator 3 or interruption of lines EL and SL somewhere control unit 90 receives only a sync word from SL or no sync word at all. If a sync word is only received from SL the switch 91 gets a switching signal from the control unit and if no sync word is received neither from SL nor EL the control unit feeds a switching signal to switch 91 and an activating signal to the sync generator 3′.

Each node, therefore, establishes a preferred direction for the sync word. The sync word coming from this direction is transmitted to all outgoing directions. The "reflected" sync words coming from the other directions, however, are suppressed in the node. The time slots of the suppressed sync words, therefore, can be occupied by stored address data combinations. For that reason a correlation receiver is connected to all incoming lines the sync words of which must be suppressed which identifies arriving sync words. The time slots carrying sync words are disconnected from the memories 11 und thus sync words are suppressed. In principle the preferred direction can be chosen arbitrarily in each node but it is favourable to have a sync word of a chosen preferred direction in a lower order node passed as a preferred sync word in the next higher order node. In this way a once chosen preferred sync word is switched through as many as possible nodes.

FIG. 5 shows a time diagram of the interlacing of sync signals and data blocks coming from the directions A, B and C of the node 5 of FIG. 4. In the node of FIG. 4 the data arriving from the various directions A, B and C are combined and transmitted on to the various outgoing directions. In accordance with FIG. 5, for example, all of the data signals arriving from the directions A and B are transmitted in direction C, which in this case consists of: the sync word Sync from A, the data block $B_K$ from B, the data block $A_1$ from A. etc. The sync word from B is suppressed since a sync word for the validity of a frame is already present from A. The next data block is inserted into this freed time slot. Similarly in FIG. 5, the data from direction B and C is fed out along direction A and the data from A and C along B. A retransmission of data from A to A is not necessary since in this embodiment the users feed their data signals into both antiparallel directed transmission lines connected to each user station.

A further embodiment of the present invention provides that the information blocks (address, data block) are suppressed or directly guided, respectively, in each of the nodes so that the information is transmitted to only those network branches in which the respective receiver is located. Consequetly, information blocks of users stations being in an established connection, in which both user stations are connected to one side of the node, are not transmitted on. This produces a substantial reduction in the average traffic load on the transmissions paths, which results in a reduction of the number of data stores required in the nodes.

This can be accomplished with the assistance of the address in the incoming data block. The address signal can be formed so as to include information which enables the node circuit to make an unequivocal decision about the direction in which this data block is to be transmitted. The node circuit, according to this embodiment of the present invention, includes a device which recognizes the address portion for determining further transmission and additionally a device for controlling the switching of whole data blocks to the respective outgoing transmission directions.

In a further embodiment of the present invention, the two transmission lines of the individual branches constitute separate transmitting and receiving lines. FIG. 6 shows a modified embodiment of the network arrangement of FIG. 1, in which there are separate transmitting lines SL and receiving lines EL. The transmitting lines Sl and receiving lines EL are directly connected through short circuit 32. The transmitting and receiving lines are connected together at only a single point 32 in the entire network which point is advisably disposed at the end of a line section at the outside limits of the network. Through the connection of point 32, all of the information present in the transmitting line is transferred into the receiving line. All of the lines in which data signals flow in the direction toward the transfer point 32 constitute the transmitting lines. The lines in which data signals flow in the opposite direction away from the transfer point 32 constitute the receiving lines. Furthermore a stand-by sync word generator 3', a control unit 90 and a switch 91 are provided at a node to avoid malfunctions.

The user stations in the network of FIG. 6 exclusively transmit their blocks in the transmitting line. In each of the nodes 5' the block signals of the incoming transmitting lines are interlaced according to a "zipper system" and are switched to the transmitting line going out from the node. Finally, these blocks, generally after having passed through a plurality of nodes, are transferred into the receiving lines at transfer point 32.

Since the block signals from all of the user stations have already been completely interlaced prior to being transferred into the receiving line, the information arriving in the respective incoming receiving line at a node is transferred without change to the outgoing receiving lines. In this embodiment of the present invention, therefore, only a single "zipper system" is required instead of a plurality of them in every node.

FIG. 7 shows a circuit for one of the nodes 5' of the network shown in FIG. 6. The intermediate storage of the data within the node is exclusively accomplished via memories 11 which are disposed in the transmitting line. This elimination of the need for extra memory units and associated circuitry signifies a substantial saving in costs.

A further advantage of this embodiment of the present invention is that the users need transmit only in one direction and expect the data intended for them from only one direction. Since each user also receives in the receiving line the information that it transmitted the user can easily determine if the blocks that it transmitted actually entered the receiving line without interference. A malfunction due to a double occupancy of a time slot, therefore, can be immediately recognized by the transmitting user without the other user having to send an error word.

It will be understood that the above description of the present invention is susceptible to various modifications, changes and adaptations, and the same are intended to be comprehended within the meaning and range of equivalents of the appended claims.

We claim:

1. In a multiple access data transmission system connected in a communication network having a plurality of branches each composed of a first and second transmission line, a plurality of individual user stations connected to the branches and a plurality of nodes interconnecting the plurality of branches so as to form an interconnected system of all of the user stations, the improvement wherein said system comprises: generating means connected in the system for periodically transmitting synchronizing words; transfer means connected at the ends of each of the branches at the end of the network for transferring the synchronizing words between said first and second transmission lines; time division means connected within each of the user stations for dividing the interval between successive synchronizing words into n equal time slots; search means connected within each of the user stations for searching for a free time slot; and transmitting means connected within each of the user stations for transmitting a data block signal over one of said transmission lines within at least one free time slot.

2. A data transmission system as defined in claim 1 wherein in each node on each of the outgoing lines the sync word of a respective preferred incoming direction is transmitted and further comprising: suppression means connected within each of said nodes for suppressing all of the incoming synchronizing words except the synchronizing word arriving at the respective node from the preferred direction of transmission.

3. A data transmission system as defined in claim 2 further comrising: address means connected within each of the user stations for producing an address signal representing the user station being called and transmitting such address signal within the free time slot, preceeding the associated data block signal, such that the address signal and the data block signal form an information block signal which fully occupies at least one time slot; and time equalization means connected within each of said nodes for synchronizing the transmission of the information block signals arriving at the respective node from each of the user stations with respect to the time slots.

4. A data transmission system as defined in claim 3 wherein said time equalization means includes: memory means capable of storing a whole multiple of the bits contained within one time slot for temporarily storing the information block signals arriving at the respective node; and readout means for reading out the information block signals from said memory means in the order in which they were stored so as to transmit them in a free time slot along a desired transmission line.

5. A data transmission system as defined in claim 1 further comprising: additional synchronizing word generator means connected within the network for automatically providing synchronizing words when a malfunction occurs in said generating means.

6. A data transmission system as defined in claim 4 wherein said address means transmits a binary "1" as the first binary bit of the address signal.

7. A data transmission system as defined in claim 4 wherein said readout means transmits the information block signals along a transmission line in which the user station being called is disposed.

8. A data transmission system as defined in claim 4 further comprising: means connected within each of said nodes for suppressing information block signals being transmitted between two user stations located on the same side of the respective node.

9. A data transmission system as defined in claim 2 wherein said first transmission line of each of said branches constitutes a transmitting line and said second transmission line of each of said branches constitutes a receiving line and that all information blocks to be transmitted from users stations are only fed to the transmission line and that all information blocks to be received from users stations are only received from the receiving line and further comprising: Feeding means connected at one point within the network for feeding the information block signals being transmitted along said transmitting line to said receiving line.

10. A data transmission system as defined in claim 9 wherein said memory means is only coupled to said transmitting lines.

11. A data transmission system as defined in claim 10 further comprising: means for providing a transfer between said transmission line and said receiving line when transmission has been interrupted by a malfunction, such transfer being effected at the node nearest the point of malfunction.

12. A data transmission system as defined in claim 6 wherein the binary "1" of the address signal is transmitted in the first binary bit position of the respective time slot and said search means includes an interrogation means for determining the presence of a binary "1" within the first binary bit position of a time slot thereby indicating if the time slot being interrogated is free.

* * * * *